US009879825B2

(12) United States Patent
Kaneko et al.

(10) Patent No.: US 9,879,825 B2
(45) Date of Patent: Jan. 30, 2018

(54) HIGH-PRESSURE TANK AND MANUFACTURING METHOD OF HIGH-PRESSURE TANK

(75) Inventors: Tomonori Kaneko, Toyota (JP); Hirokazu Otsubo, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/701,856

(22) PCT Filed: Jun. 8, 2010

(86) PCT No.: PCT/JP2010/003820
§ 371 (c)(1),
(2), (4) Date: Dec. 4, 2012

(87) PCT Pub. No.: WO2011/154994
PCT Pub. Date: Dec. 15, 2011

(65) Prior Publication Data
US 2013/0087567 A1    Apr. 11, 2013

(51) Int. Cl.
*F17C 1/02* (2006.01)
*F17C 1/06* (2006.01)
(Continued)

(52) U.S. Cl.
CPC ............... *F17C 1/06* (2013.01); *F17C 1/16* (2013.01); *B29C 53/562* (2013.01); *B29C 53/58* (2013.01);
(Continued)

(58) Field of Classification Search
CPC ...... F17C 1/06; F17C 1/16; F17C 1/04; F17C 1/00; F17C 2203/0619; F17C 2203/0604;
(Continued)

(56) References Cited

U.S. PATENT DOCUMENTS 3,083,864 A * 4/1963 Young ..................... 220/590
5,025,943 A * 6/1991 Forsman .............. B29C 53/602
220/589

(Continued)

FOREIGN PATENT DOCUMENTS

CN    101189470    5/2008
CN    101356400    1/2009
(Continued)

OTHER PUBLICATIONS

Machine Translation of JP2008032088.*

*Primary Examiner* — Fenn C Mathew
*Assistant Examiner* — Elizabeth Volz
(74) *Attorney, Agent, or Firm* — Finnegan, Henderson, Farabow, Garrett & Dunner, LLP

(57) ABSTRACT

A high-pressure tank configured to store a fluid includes: a liner; and a fiber-reinforced resin layer configured to cover surface of the liner. The liner includes: a cylindrical liner portion in a cylindrical shape; and dome liner portions in a dome shape, each dome liner portion being connected with the cylindrical liner portion, such that an outer surface of the dome liner portion is inclined at a predetermined angle to an outer surface of the cylindrical liner portion. The fiber-reinforced resin layer includes a hoop layer provided by hoop winding that winds the fiber substantially perpendicularly to a central axis of the cylindrical liner portion. The hoop layer is formed, such that an outer surface of the hoop layer has a smaller angle than the predetermined angle to the outer surface of the dome liner portion at a boundary between the hoop layer and the dome liner portion.

9 Claims, 8 Drawing Sheets

(51) Int. Cl.
*F17C 1/16* (2006.01)
*F17C 1/00* (2006.01)
*B29D 22/00* (2006.01)
*F17C 1/04* (2006.01)
*B32B 1/02* (2006.01)
*B29C 53/56* (2006.01)
*B29C 53/58* (2006.01)
*B29C 53/60* (2006.01)
*B32B 1/00* (2006.01)

(52) U.S. Cl.
CPC .......... *B29C 53/602* (2013.01); *B29D 22/003* (2013.01); *B32B 1/00* (2013.01); *B32B 1/02* (2013.01); *F17C 1/00* (2013.01); *F17C 1/04* (2013.01); *F17C 2201/0109* (2013.01); *F17C 2203/012* (2013.01); *F17C 2203/0604* (2013.01); *F17C 2203/0619* (2013.01); *F17C 2203/0621* (2013.01); *F17C 2203/0636* (2013.01); *F17C 2203/0665* (2013.01); *F17C 2203/0668* (2013.01); *F17C 2203/0673* (2013.01); *F17C 2205/0305* (2013.01); *F17C 2205/0397* (2013.01); *F17C 2209/232* (2013.01); *F17C 2223/036* (2013.01); *Y02E 60/321* (2013.01)

(58) Field of Classification Search
CPC ........ F17C 2203/012; F17C 2203/0673; F17C 2203/0668; F17C 2203/0665; F17C 2203/0636; F17C 2203/0621; F17C 2209/232; F17C 2205/0305; F17C 2223/036; F17C 2201/0109; B29C 53/58; B29C 53/562; B29C 53/602; Y02E 60/321; B32B 1/00; B32B 1/02; B29D 22/003
USPC ............ 220/586, 590, 592, 62.18, 588, 589; 242/430
See application file for complete search history.

(56) References Cited

U.S. PATENT DOCUMENTS

| | | | | |
|---|---|---|---|---|
| 5,385,263 A | * | 1/1995 | Kirk et al. | 220/589 |
| 2009/0078706 A1 | | 3/2009 | Ishitoya et al. | |
| 2010/0258573 A1 | | 10/2010 | Weber | |
| 2010/0276434 A1 | * | 11/2010 | Berger et al. | 220/586 |

FOREIGN PATENT DOCUMENTS

| | | | | |
|---|---|---|---|---|
| CN | 201475632 | | 5/2010 | |
| EP | 0 666 450 A1 | | 8/1995 | |
| JP | 2004-293571 | | 10/2004 | |
| JP | 2005-113971 | | 4/2005 | |
| JP | 2008-45660 | | 2/2008 | |
| JP | 2008032088 | * | 2/2008 | F17C 1/06 |

* cited by examiner

HOOP LAYER

LOW-ANGLE HELICAL LAYER

HIGH-ANGLED HELICAL LAYER

Fig.6

DETAILED STRUCTURE OF FIBER-REINFORCED RESIN LAYER 50a
OF HIGH-PRESSURE TANK 10a

| LAYER NUMBER | HOOP LAYER | HIGH-ANGLE HELICAL LAYER | LOW-ANGLE HELICAL LAYER |
|---|---|---|---|
| 1,2 | | | O |
| 3 | O | | |
| 4-6 | | O | |
| 7,8 | | | O |
| 9 | O | | |
| 10 | | O | |
| 11,12 | O | | |
| 13,14 | | | O |
| 15 | O | | |
| 16 | | O | |
| 17,18 | O | | |
| 19,20 | | | O |
| 21 | O | | |
| 22 | | O | |
| 23,24 | O | | |
| 25,26 | | | O |
| 27 | O | | |
| 28 | | O | |
| 29,30 | O | | |
| 31,32 | | | O |
| 33 | O | | |
| 34 | | O | |
| 35,36 | O | | |
| 37,38 | | | O |
| 39 | O | | |
| 40 | | O | |
| 41-43 | O | | |
| 44-54 | | | O |
| 55-57 | | O | |

US 9,879,825 B2

HIGH-PRESSURE TANK AND MANUFACTURING METHOD OF HIGH-PRESSURE TANK

CROSS-REFERENCE TO RELATED APPLICATIONS

This application is a national phase application of International Application No. PCT/JP2010/003820, filed Jun. 8, 2010, the content of which is incorporated herein by reference.

TECHNICAL FIELD

The present invention relates to a high-pressure tank configured to store a fluid at a higher pressure than the ordinary pressure, and a manufacturing method of such a high-pressure tank.

BACKGROUND ART

In recent years, development of the vehicle has been advanced to be driven with combustion energy of a fuel gas or with electrical energy produced by the electrochemical reaction of the fuel gas. A high-pressure tank used to store a fuel gas, such as natural gas or hydrogen, may be mounted on such a vehicle.

In order to increase the drivable distance of the vehicle, it is preferable to fill the high-pressure tank with the fuel gas at a higher fill pressure (e.g., 70 MPa). The improvement in strength of the high-pressure tank is required to fill the high-pressure fuel gas in the high-pressure tank. The known technology winds the fibers impregnated with a resin on the outer circumferential surface of a liner to form a reinforcement layer, in order to improve the strength of the high-pressure tank. More specifically, the known technology reinforces a body section in a substantially cylindrical shape forming the liner with a hoop layer, while reinforcing hemispherical dome sections connected with the respective ends of the body section in a continuous manner with helical layers (for example, Patent Literature 1). The hoop layer is used to ensure the strength mainly in the circumferential direction, and the helical layers are used to ensure the strength mainly in the longitudinal direction (in the axial direction).

Another known structure of the high-pressure tank has an outer fiber layer formed by high-angle winding (also called "high-angle helical winding") outside the liner, instead of the hoop layer (for example, Patent Literature 2). The outer fiber layer is formed by high-angle winding, because the hoop winding causes the fibers to slip along the outer surface of the dome sections in the dome shape and thereby fails to wind the fibers on the outer surface of the dome sections and form the hoop layer.

CITATION LIST

Patent Literatures

Patent Literature 1: JP-A-2008-45660
Patent Literature 2: JP-A-2004-293571

SUMMARY

Technical Problem

In the high-pressure tank with a fiber-reinforced resin layer, due to a variation in thickness of the fiber-reinforced resin layer or a variation in rigidity, the concentration of stress may occur at the boundaries between the cylindrical section in the substantially cylindrical shape and the dome sections in the dome shape formed on the respective sides of the cylindrical section. The concentration of stress especially occurs in a specific portion on the side of the dome section at the boundary. It is accordingly preferable to reinforce the boundary with a reinforcement layer. The specific portion on the side of the dome section at the boundary is also called "shoulder". The boundaries between the cylindrical section and the dome sections of the high-pressure tank are provided at the positions corresponding to the boundaries between a cylindrical liner portion in a cylindrical shape of the liner and dome liner portions in a dome shape connected with the respective sides of the cylindrical liner portion. It is thus difficult to wind the fibers on the shoulders by hoop winding, and reinforcement layers may be formed on the shoulders by high-angle helical winding. Compared with the hoop winding, however, the high-angle helical winding has lower resistance to the stress applied on the high-pressure tank in the circumferential direction. The high-angle helical winding accordingly requires a greater number of winds of the fiber than that of the hoop winding. This means the high-pressure tank with the reinforcement layer formed by high-angle helical winding uses the greater amount of the fiber. This problem is not characteristic of the high-pressure tank filled with the fuel gas but it commonly found in any high-pressure tank is filled with a fluid at a higher pressure than the ordinary pressure.

In order to solve the foregoing, the object of the invention is to provide the technology that prevents a decrease of the strength of a high-pressure tank, while reducing the amount of fibers used.

Solution to Problem

In order to solve at least part of the foregoing, the invention provides any of the following aspects or embodiments.

First Aspect

A high-pressure tank configured to store a fluid, comprising:
a liner; and
a fiber-reinforced resin layer configured to include a fiber and to cover surface of the liner,
  wherein the liner includes:
  a cylindrical liner portion in a cylindrical shape; and
  dome liner portions in a dome shape connected with respective sides of the cylindrical liner portion, each the dome liner portion being connected with the cylindrical liner portion, such that an outer surface of the dome liner portion is inclined at a predetermined angle to an outer surface of the cylindrical liner portion,
  wherein the fiber-reinforced resin layer includes:
  a hoop layer formed on the outer surface of the cylindrical liner portion to cover the outer surface of the cylindrical liner portion, the hoop layer being provided by hoop winding that winds the fiber substantially perpendicularly to a central axis of the cylindrical liner portion,
  wherein the hoop layer is formed, such that an outer surface of the hoop layer has a smaller angle than the predetermined angle to the outer surface of the dome liner portion at a boundary between the hoop layer and the dome liner portion.

In the high-pressure tank of the first aspect, the boundaries between a cylindrical section and dome sections of the high-pressure tank are reinforced with the hoop layer formed to cover the outer surface of the cylindrical liner portion. The liner is provided, such that the dome liner portion is inclined at the predetermined angle to the cylindrical liner portion. The boundary including the shoulder of the high-pressure tank is reinforced in advance by formation of the hoop layer in a specified shape on the outer surface of the cylindrical liner portion. This configuration advantageously prevents a decrease of the strength of the high-pressure tank without forming any high-angle helical layer. This configuration does not require formation of any high-angle helical layer and thereby reduces the amount of fibers used. The hoop layer is formed, such that the outer surface of the hoop layer has the smaller angle than the predetermined angle to the outer surface of the dome liner portion at the boundary between the hoop layer and the dome liner portion. This configuration ensures smooth winding of the fiber when the fiber is wound over the hoop layer and the dome liner portion. This allows winding of the fiber favorable for the strength and thereby effectively prevents a decrease of the strength of the high-pressure tank.

Second Aspect

The high-pressure tank according to the second aspect, wherein the hoop layer includes:
a cylindrical hoop portion configured to have a fixed thickness; and
a dome hoop portion located between the cylindrical hoop portion and the dome liner portion, the dome hoop being configured to have thickness gradually decreasing from the fixed thickness, from the cylindrical hoop portion toward the dome liner portion.

In the high-pressure tank of the second aspect, the dome hoop portion is formed to have the thickness gradually decreasing in a predetermined direction. This enable easy formation of the hoop layer, such that the outer surface of the hoop layer has the smaller angle than the predetermined angle to the outer surface of the dome liner portion at the boundary between the hoop layer and the dome liner portion.

Third Aspect

The high-pressure tank according to either one of the first aspect and the second aspect,
wherein the cylindrical hoop portion is formed by stacking a predetermined number of layers of the fiber, and
the dome hoop portion is formed by gradually decreasing the number of layers of the fiber from the predetermined number, from the cylindrical hoop portion toward the dome liner portion.

In the high-pressure tank of the third aspect, the number of layers of fiber in the dome hoop portion is decreased toward a predetermined direction. This enable easy formation of the hoop layer, such that the outer surface of the hoop layer has the smaller angle than the predetermined angle to the outer surface of the dome liner portion at the boundary between the hoop layer and the dome liner portion.

Fourth Aspect

The high-pressure tank according to any one of the first aspect to the third aspect,
wherein the hoop layer is formed, such that a slope of a tangent line on the outer surface of the hoop layer is equal to a slope of a tangent line on the outer surface of the dome liner portion at the boundary.

In the high-pressure tank of the fourth aspect, the slope of the tangent line on the outer surface of the hoop layer is equal to the slope of the tangent line on the outer surface of the dome liner portion at the boundary between the hoop layer and the dome liner portion. This configuration ensures smoother winding of the fiber when the fiber is further wound over the hoop layer and the dome liner portion. This allows winding of the fiber more favorable for the strength and thereby more effectively prevents a decrease of the strength of the high-pressure tank.

Fifth Aspect

The high-pressure tank according to any one of the first aspect to the fourth aspect,
wherein the fiber-reinforced resin layer further includes:
a helical layer formed on the outer surface of the hoop layer and the outer surface of the dome liner portion, the helical layer being provided by helical winding,
wherein the helical winding turns back a winding direction of the fiber at the dome liner portion before the fiber in the helical layer goes round the central axis on the hoop layer.

In the high-pressure tank of the fifth aspect, the helical layer can be smoothly formed over the hoop layer and the dome liner portion. This ensures reinforcement of the high-pressure tank with the helical layer.

Sixth Aspect

The high-pressure tank according to the fifth aspect, wherein the fiber-reinforced resin layer has a first type of layer formed by the hoop winding and a second type of layer formed by the helical winding.

In the high-pressure tank of the sixth aspect, the boundary including the shoulder between the cylindrical section and the dome section of the high-pressure tank is reinforced with the fiber-reinforced resin layer without any high-angle helical layer. This configuration ensures reinforcement of the high-pressure tank without forming any high-angle helical layer, while reducing the amount of fibers used.

BRIEF DESCRIPTION OF DRAWINGS

FIG. 6 shows the detailed structure of a fiber-reinforced resin layer 50a in a high-pressure tank 10a of a reference example;

DESCRIPTION OF EMBODIMENTS

Figure 1A:
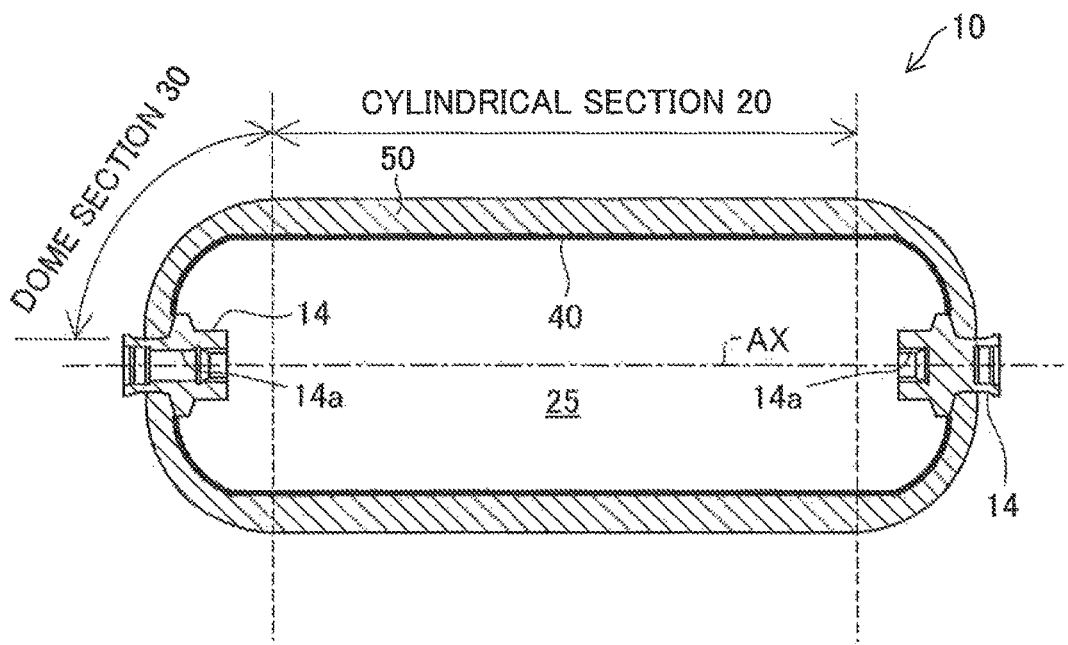
FIGS. 1A and 1B illustrate the structure of a high-pressure tank 10 according to one embodiment of the invention.
Figure 1B:
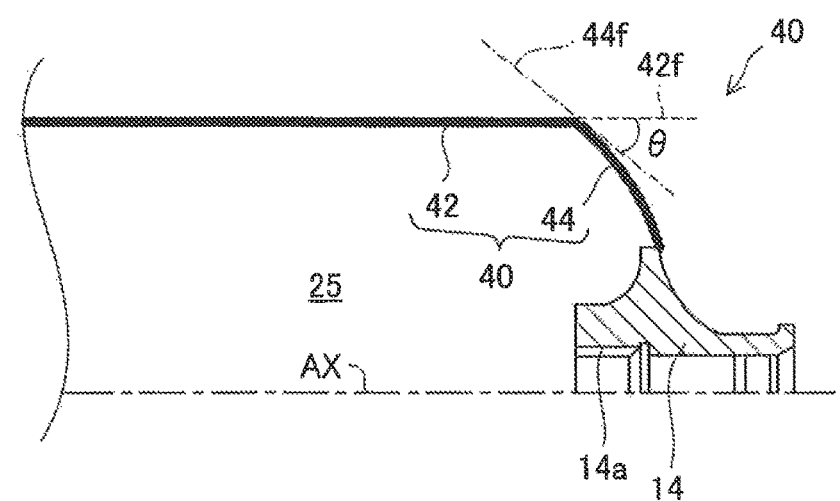

Some aspects and embodiments of the invention are described below in the following sequence:
A. Embodiment
B. Modifications A. Embodiment A-1. General Structure FIGS. 1A and 1B illustrates the structure of a high-pressure tank 10 according to one embodiment of the invention. FIG. 1A is a cross sectional view of the high-pressure tank 10. FIG. 1B is a partly-enlarged cross sectional view of FIG. 1A, where a fiber-reinforced resin layer 50 described later is omitted from the illustration.

As shown in FIG. 1A, the high-pressure tank 10 has a liner 40, a fiber-reinforced resin layer 50 arranged to cover the surface of the liner 40 and two mouthpieces 14. The mouthpiece 14 has an opening 14a. The high-pressure tank 10 may be structured to have only one of the two mouthpieces 14.

The liner 40 is a portion called as the inner shell or the inner container of the high-pressure tank 10 and has an inner space 25 for storage of a fluid. The liner 40 has gas barrier properties to prevent transmission of a gas, such as hydrogen gas, to outside. The liner 40 may be made of a synthetic resin such as a nylon resin or a polyethylene resin or a metal such as stainless steel. According to this embodiment, the liner 40 is integrally made of a nylon resin.

The fiber-reinforced resin layer 50 is a layer of a thermosetting resin reinforced with fibers and is formed by winding fibers on the surface of the liner 40 by filament winding method (hereinafter referred to as "FW method"). The fiber-reinforced resin layer 50 is structured to have the layered fibers. The FW method winds the reinforcing fiber impregnated with a thermosetting resin on a mandrel (liner 40 in this embodiment) and thermally cures the thermosetting resin. The filament winding method will be described later. The thermosetting resin may be an epoxy resin, a polyester resin or a polyamide resin. This embodiment uses an epoxy resin as the thermosetting resin.

The reinforcing fiber may be any of various fibers including metal fibers, glass fibers, carbon fibers, inorganic fibers like alumina fibers, synthetic organic fibers like aramid fibers and natural organic fibers like cotton. Any of these fibers may be used alone, or two or more different fibers may be used in combination. According to this embodiment, carbon fiber is used as the reinforcing fiber.

The following describes the overall shape of the high-pressure tank 10. The high-pressure tank 10 has a cylindrical section 20 in a substantially cylindrical shape and dome sections 30 in a dome shape located on respective sides of the cylindrical section 20. The dome section 30 is tapered to decrease the diameter with increasing distance from the cylindrical section 20 in the direction of a central axis AX of a cylindrical liner portion 42. The smallest-diameter part has an opening, and the mouthpiece 14 is inserted in the opening.

As shown in FIG. 1B, the liner 40 has a cylindrical liner portion 42 in a cylindrical shape and dome liner portions 44 in a dome shape located on respective sides of the cylindrical liner portion 42. The dome liner portion 44 is tapered to decrease the diameter with increasing distance from the cylindrical liner portion 42 in the direction of the central axis AX of the cylindrical liner portion 42. The outer surface of the dome liner portion 44 forms the equally stressed surface. The cylindrical liner portion 42 and the dome liner portions 44 are formed, such that tangent lines on the respective outer surfaces are discontinuous at the boundaries between the cylindrical liner portion 42 and the dome liner portions 44. In other words, the liner 40 is formed, such that a tangent line on the outer surface of the cylindrical liner portion 42 is not equal to tangent lines on the outer surfaces of the dome liner portions 44 at the boundaries between the respective portions 42 and 44. More specifically, the liner 40 is formed, such that a tangent line 44f on the outer surface of the dome liner portion 44 is inclined at an angle θ (23 degrees in the embodiment) to a tangent line 42f on the outer surface of the cylindrical liner portion 42.

A-2. Detailed Structure of Fiber-Reinforced Resin Layer 50

Figure 2A:
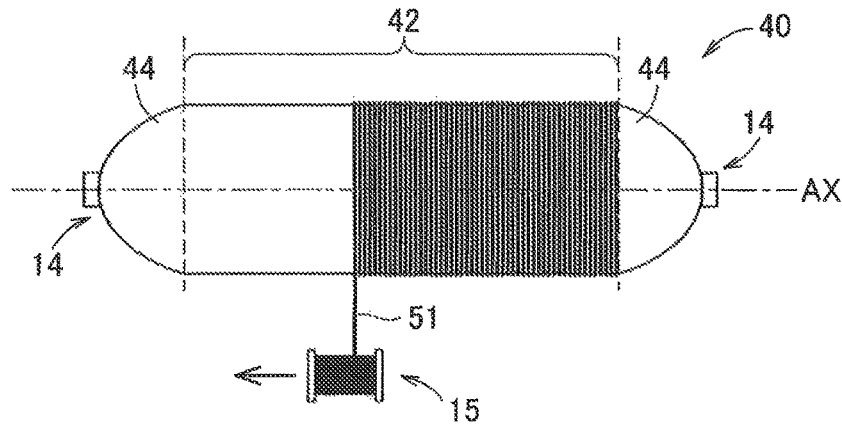
FIGS. 2A to 2C illustrate various winding methods used to form a fiber-reinforced resin layer.
Figure 2B:
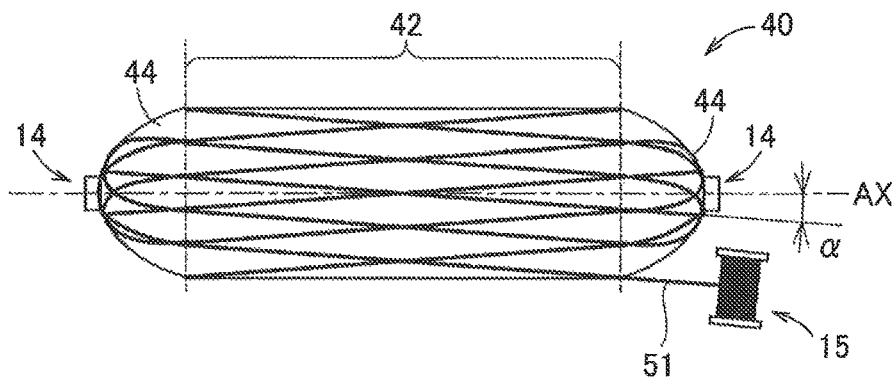
Figure 2C:
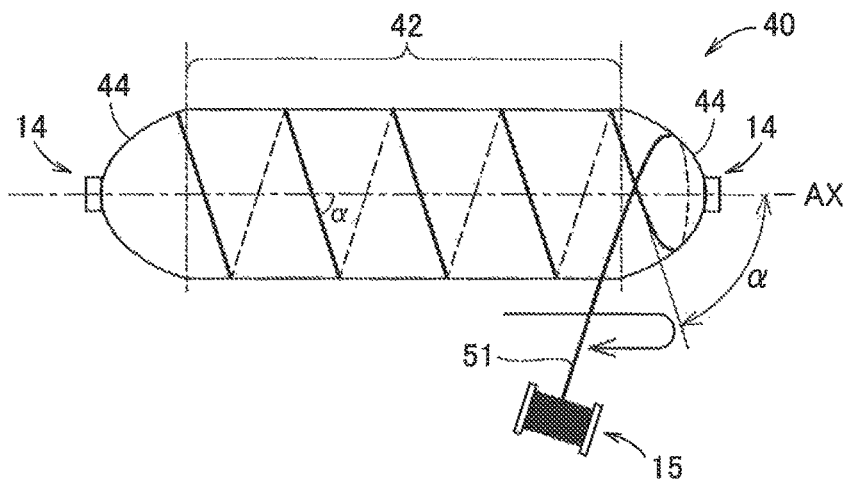

Prior to description of the structure of the fiber-reinforced resin layer 50, the following describes the general filament winding methods used to form the fiber-reinforced resin layer with reference to FIGS. 2A to 2C. FIGS. 2A to 2C illustrate various winding methods used to form the fiber-reinforced resin layer. A guide 15 used to wind fibers 51 on the liner 40 is shown in FIGS. 2A to 2C.

FIG. 2A illustrates hoop winding and more specifically the process of winding the fibers 51 on the liner 40 by hoop winding. The "hoop winding" method winds the fibers 51 substantially perpendicular to the central axis AX of the cylindrical liner portion 42, while successively moving the winding position (position of the guide 15) in the direction of the central axis AX. In other words, the "hoop winding" method winds the fibers 51, such that an angle α of the central axis AX and the winding direction of the fibers 51 ("winding angle α") is substantially orthogonal to each other. The "substantially orthogonal winding angle of the fibers 51 by hoop winding" includes 90 degrees and an angle range around 90 degrees that may be caused by shifting the winding position of the fibers to avoid overlap of the fibers. The layer formed by hoop winding is called "hoop layer".

FIG. 2B illustrates low-angle helical winding and more specifically the process of winding the fibers 51 on the liner 40 by low-angle helical winding. The "low-angle helical winding" method winds the fibers 51 at such a winding angle α that the winding direction of the fibers 51 is turned back at the dome liner portion 44 before the fibers 51 go round the central axis AX at the cylindrical liner portion 42. The layer formed by low-angle helical winding is called "low-angle helical layer".

FIG. 2C illustrates high-angle helical winding and more specifically the process of winding the fibers 51 on the liner 40 by high-angle helical winding. The "high-angle helical winding" method winds the fibers 51 at such a winding angle α that the fibers 51 go round the central axis AX at least once at the cylindrical liner portion 42 until the winding direction of the fibers 51 is turned back. The layer formed by high-angle helical winding is called "high-angle helical layer".

Figure 3A:
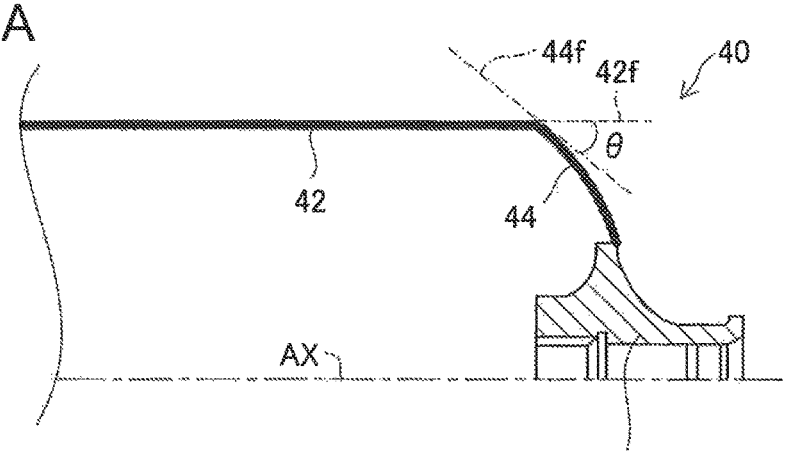
FIGS. 3A to 3C illustrate a manufacturing method of the high-pressure tank 10 according to the embodiment.
Figure 3B:
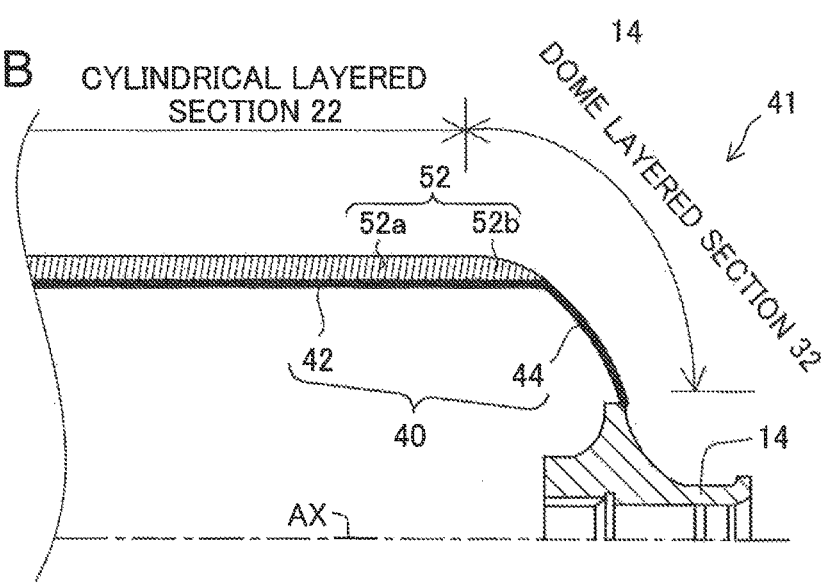
Figure 3C:
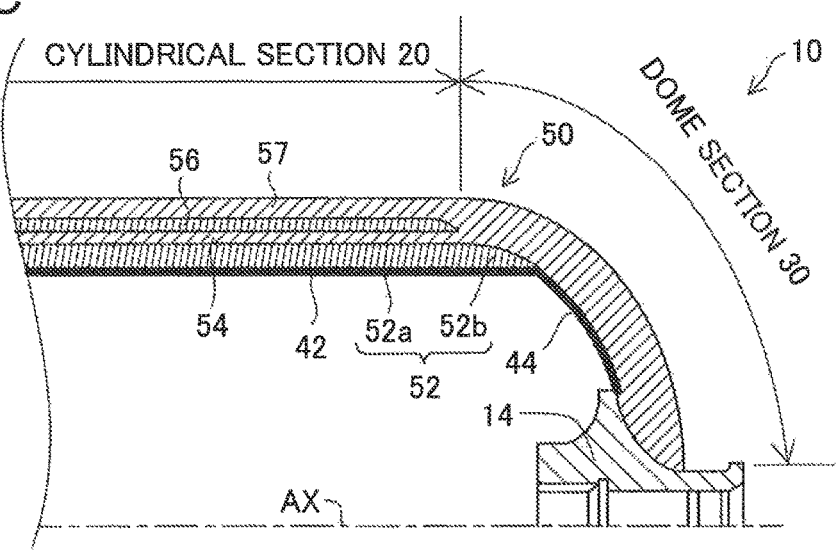

FIGS. 3A to 3C illustrate a manufacturing method of the high-pressure tank 10 according to the embodiment. Only part of the high-pressure tank 10 required for explanation is shown in FIGS. 3A to 3C. As shown in FIG. 3A, the liner 40 is provided to have discontinuous tangent lines on the respective outer surfaces at the boundaries between the cylindrical liner portion 42 and the dome liner portions 44.

As shown in FIG. 3B, a hoop layer 52 is then formed to cover the entire outer surface area of the cylindrical liner portion 42. In order to discriminate the hoop layer 52 from other hoop layers described later, the hoop layer 52 laid on the outer surface of the cylindrical liner portion 42 is called "outer surface hoop layer 52". The outer surface hoop layer 52 includes a cylindrical hoop portion 52a and a dome hoop portion 52b.

The cylindrical hoop portion 52a is formed by stacking a predetermined number of layers of fibers (thirteen layers in the embodiment). The cylindrical hoop portion 52a is accordingly formed as a layer of a fixed thickness. The dome hoop portion 52b is formed between the cylindrical hoop portion 52a and the dome liner portion 44 in the direction of the central axis AX. The dome hoop portion 52b is formed to gradually decrease the thickness from the side of the cylindrical hoop portion 52a toward the side of the dome liner portion 44. In other words, the number of layers of fibers in the dome hoop portion 52b is gradually reduced from the cylindrical hoop portion 52a toward the dome liner portion 44. According to this embodiment, the number of layers of fibers in the dome hoop portion 52b is varied, such that the outer surface of the dome hoop portion 52b and the outer surface of the dome liner portion 44 form the same equally stressed surface. In other words, the dome hoop portion 52b is formed, such that the slope of the tangent line on the outer surface of the dome hoop portion 52b is equal to the slope of the tangent line on the outer surface of the dome liner portion 44 at the boundaries between the dome hoop portion 52b and the dome liner portion 44. For convenience of explanation, the object obtained by forming the outer surface hoop layer 52 on the liner 40 is called "hoop-layered liner 41".

When attention is focused on the shape of the hoop-layered liner 41, the hoop-layered liner 41 includes a cylindrical layered section 22 in a substantially cylindrical shape and dome layered sections 32 in a dome shape connected with respective sides of the cylindrical layered section 22. The dome layered section 32 includes the dome liner portion 44 and the dome hoop portion 52b and has the equally stressed outer surface.

As shown in FIG. 3C, after formation of the outer surface hoop layer 52, a low-angle helical layer 54 is further formed to cover the entire outer surface area of the dome liner portion 44 and the entire outer surface area of the outer surface hoop layer 52. In order to discriminate the low-angle helical layer 54 from other low-angle helical layers described later, the low-angle helical layer 54 laid on the outer surface of the outer surface hoop layer 52 is called "outer surface low-angle helical layer 54".

A plurality of hoop layers 56 and a plurality of low-angle helical layers 57 are further formed outside the outer surface low-angle helical layer 54 in the fiber-reinforced resin layer 50. The plurality of hoop layers 56 and the plurality of low-angle helical layers 57 are schematically shown in FIG. 3C. The concrete stack structure of the respective component layers of the fiber-reinforced resin layer 50 will be described later.

After the fibers 51 are wound on the liner 40 by the above procedure, the high-pressure tank 10 is heated to cure the thermosetting resin. This completes the high-pressure tank 10 of the embodiment. The high-pressure tank 10 after formation of the fiber-reinforced resin layer 50 has the cylindrical section 20 in the substantially cylindrical shape and the dome sections 30 tapered to decrease the outer diameter with increasing distance from the cylindrical section 20 as shown in FIG. 3C. The cylindrical section 20 includes part of the cylindrical liner portion 42, and the dome section 30 includes the dome liner portion 44 and the remaining part of the cylindrical liner portion 42. The cylindrical section 20 also includes the cylindrical hoop portion 52a, and the dome section 30 includes the dome hoop portion 52b (FIG. 3B).

Figure 4:
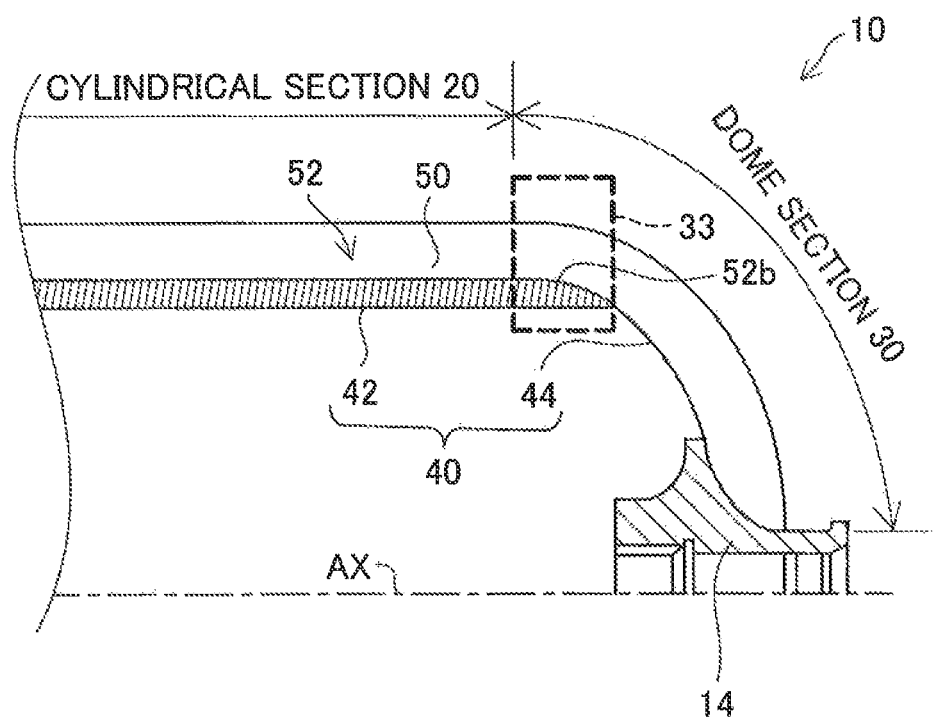
FIG. 4 illustrates the advantageous effects of the high-pressure tank 10.

FIG. 4 illustrates the advantageous effects of the high-pressure tank 10. FIG. 4 is a partial cross sectional view of the high-pressure tank 10, wherein the outer surface hoop layer 52 required for explanation is hatched in the fiber-reinforced resin layer 50. The cylindrical section 20 of the high-pressure tank 10 has the hoop layers 52 and 56 and the low-angle helical layers 54 and 57 (FIG. 3C). A specific part of the dome section 30 corresponding to the dome liner portion 44 has only the low-angle helical layers 54 and 57 (FIG. 3C). The fiber-reinforced resin layer 50 on the cylindrical liner portion 42 accordingly has the greater thickness than the fiber-reinforced resin layer 50 on the dome liner portion 44. In the high-pressure tank 10 of the embodiment, the fiber-reinforced resin layer 50 on the dome liner portion 44 is formed of only the low-angle helical layers. This is because the dome liner portion 44 can be reinforced by only the low-angle helical layers in the direction of the central axis AX and in the circumferential direction seen from the central axis AX. The low-angle helical layers, on the other hand, reinforce the cylindrical section 20 mainly in the direction of the central axis AX. For the purpose of reinforcement in the circumferential direction, the hoop layer is to be wound on the cylindrical liner portion 42. This is the reason why the cylindrical section 20 and the dome section 30 have different thicknesses of the fiber-reinforced resin layer 50. This leads to a difference between the stress produced in the cylindrical section 20 and the stress produced in the dome section 30 of the high-pressure tank. Secondary stress (shear stress and bending stress) is then produced to share the displacement in a boundary area 33 (shoulder 33) of the dome section 30 at the boundary between the cylindrical section 20 and the dome section 30. In other words, the shoulder 33 of the fiber-reinforced resin layer 50 has the higher stress concentration than the other part of the fiber-reinforced resin layer 50.

According to the embodiment, the specific part forming the shoulder 33 with the stress concentration in the manufactured high-pressure tank 10 is reinforced with the outer surface hoop layer 42 (more specifically the dome hoop portion 52b). The shoulder 33 can thus be reinforced without high-angle helical winding. Compared with a high-pressure tank with a high-angle helical layer formed for reinforcement of the shoulder 33, this method reduces the amount of fibers used and thereby enables the high-pressure tank to be manufactured in a shorter time.

The outer surface of the dome hoop portion 52b and the outer surface of the dome liner portion 44 form the equally stressed surface at the boundary between the dome hoop portion 52b and the dome liner portion 44 (FIG. 3B). The low-angle helical layers 54 and 57 can thus be formed according to a predetermined winding specification of low-angle helical winding. In other words, since the outer surface of the dome hoop portion 52b and the outer surface of the dome liner portion 44 form the equally stressed surface, low-angle helical winding is allowed, based on, for example, network theory. This ensures reinforcement by the low-angle helical layer and prevents reduction of the overall strength of the high-pressure tank 10.

A-3. Simulation of Fiber Strain

The following describes a simulation showing that the high-pressure tank 10 of the embodiment has successful reinforcement of the shoulder 33, like a high-pressure tank 10a of a reference example reinforced by a high-angle helical layer.

Figure 5A:
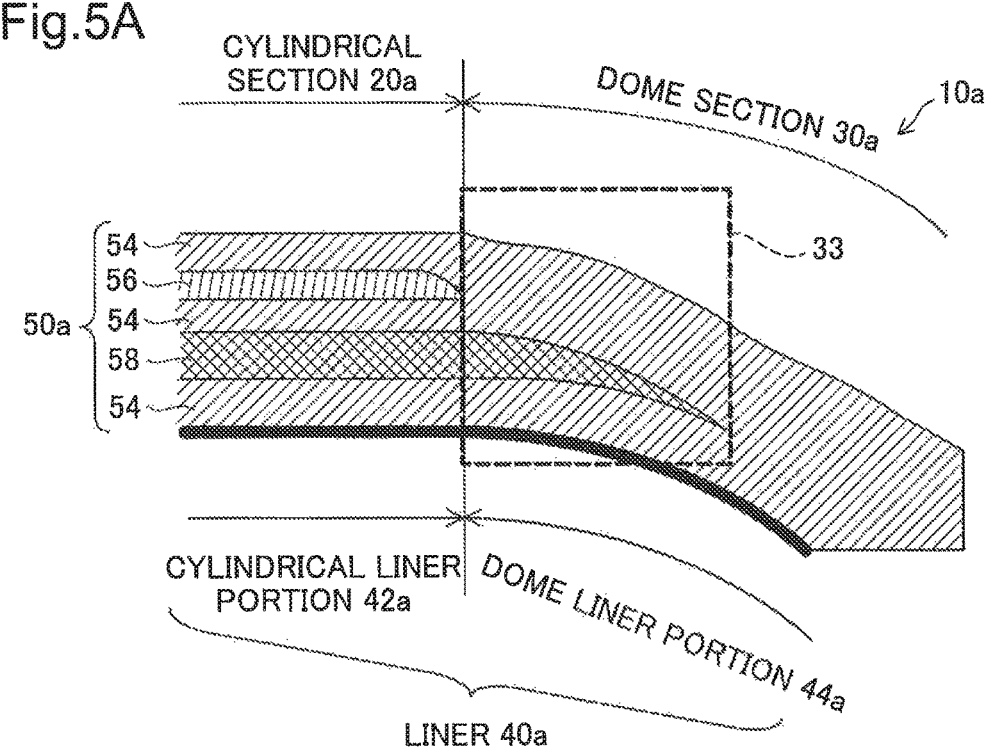
FIGS. 5A and 5B illustrate high-pressure tanks used in the simulation.
Figure 5B:
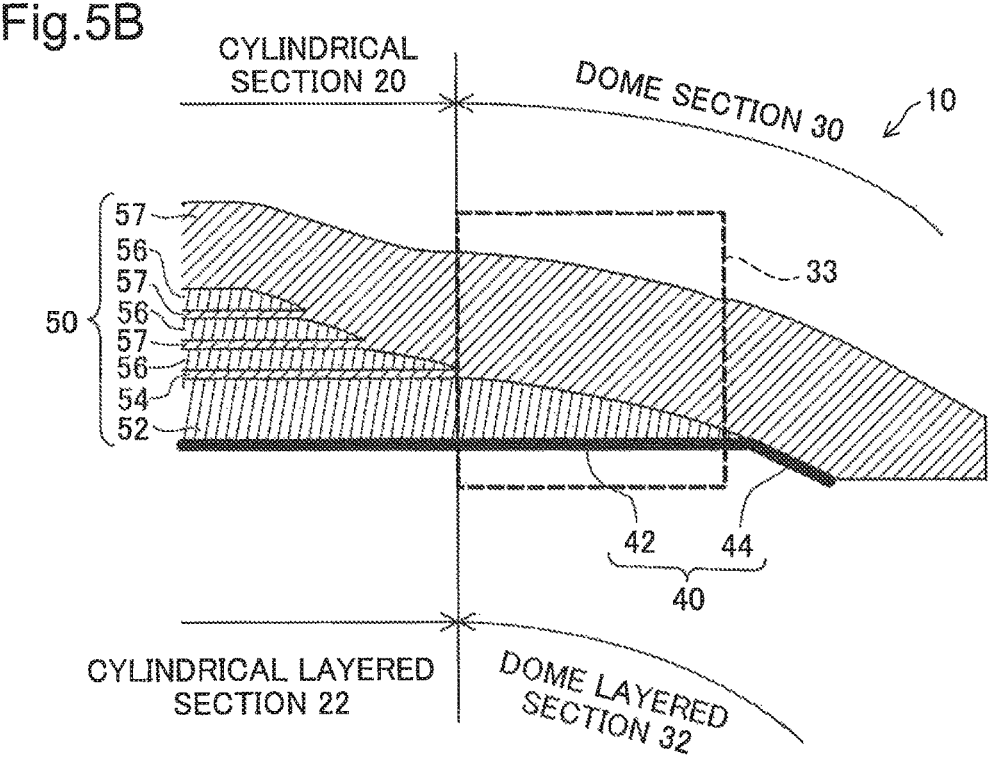

FIGS. 5A and 5B illustrate the high-pressure tanks used in the simulation. FIG. 5A is a partial cross sectional view illustrating the high-pressure tank 10a of the reference example. FIG. 5B is a partial sectional view illustrating the high-pressure tank 10 of the embodiment. More specifically, FIGS. 5A and 5B schematically illustrate the cross section of a liner 40a or 40 and a fiber-reinforced resin layer 50a or 50 proximate to the boundary between a cylindrical section 20a or 20 and a dome section 30a or 30, respectively. The differences between the high-pressure tank 10a of the reference example and the high-pressure tank 10 of the embodiment include the shapes of the liners 40a and 40 and the structures of the fiber-reinforced resin layers 50a and 50. The mouthpieces 14 (FIG. 1A) and the material (CFRP) used for the fiber-reinforced resin layer 50a or 50 are the same between the high-pressure tank 10a of the reference example and the high-pressure tank 10 of the embodiment.

FIG. 6 shows the detailed structure of the fiber-reinforced resin layer 50a in the high-pressure tank 10a of the reference example. In FIG. 6, the layer number is sequentially allocated to each of the fiber layers to be stacked in a sequence from the lower-most layer. The "open circle" in FIG. 6 shows which type of the fiber layer is formed for each layer. For example, the low-angle helical layer is formed for the layer numbers 1 and 2, the hoop layer is formed for the layer number 3, and the high-angle helical layer is formed for the layer numbers 4 to 6. In the description hereof, "one layer" means that the whole area of a layer as the target to be reinforced is covered closely without any space. The fiber-reinforced resin layer 50a in the high-pressure tank 10a of the reference example has fifty seven layers and the maximum thickness of 36.2 mm.

The high-pressure tanks 10 and 10a are further described with reference back to FIGS. 5A and 5B. As shown in FIG. 5A, the liner 40a in the high-pressure tank 10a of the reference example includes a cylindrical liner portion 42a in a cylindrical shape and dome liner portions 44a in a dome shape located on respective sides of the cylindrical liner portion 42a. The outer surface of the dome liner portion 44a forms the equally stressed surface. The difference from the liner 40 in the high-pressure tank 10 of the embodiment is that the slope of the tangent line on the outer surface of the cylindrical liner portion 42a is equal to the slope of the tangent line on the outer surface of the dome liner portion 44a at the boundary between the cylindrical liner portion 42a and the dome liner portion 44a in the high-pressure tank 10a of the reference example.

The fiber-reinforced resin layer 50a of the reference example has the stack structure of multiple low-angle helical layers 54, multiple high-angle helical layers 58 and multiple hoop layers 56. The low-angle helical layer 54 is formed to cover the entire area of the liner 40a. The high-angle helical layer 58 is formed to cover the entire area of the cylindrical liner portion 42a and part of the dome liner portion 44a. More specifically, the high-angle helical layer 58 is formed to cover not only the cylindrical liner portion 42a but a boundary area 33 (shoulder 33) of the dome liner portion 44a at the boundary between the cylindrical liner portion 42a and the dome liner portion 44a. The high-pressure tank 10a accordingly has the high-angle helical layers 58 for reinforcement of the shoulder 33. The hoop layers 56 are formed to cover the entire area of the cylindrical liner portion 42a, in order to ensure the strength in the circumferential direction. The respective layers 54, 56 and 58 are stacked in the sequence shown in FIG. 6.

The structure of the liner 40 and the schematic structure of the fiber-reinforced resin layer 50 in the high-pressure tank 10 of the embodiment have been described previously. The following accordingly describes the detailed structure of the fiber-reinforced resin layer 50 with reference to FIG. 5B. The fiber-reinforced resin layer 50 has the stack structure of total forty seven layers: the outer surface hoop layer 52 for the layer numbers 1 to 13, the outer surface low-angle helical layer 54 for the layer numbers 14 and 15, the hoop layer 56 for the layer numbers 16 to 19, the low-angle helical layer 57 for the layer numbers 20 and 21, the hoop layer 56 is formed for the layer numbers 22 to 25, the low-angle helical layer 57 for the layer numbers 26 and 27, the hoop layer 56 for the layer numbers 28 to 30, and the low-angle helical layer 57 for the layer numbers 31 to 47. The fiber-reinforced resin layer 50 has the maximum thickness of 28.5 mm.

Figure 7A:
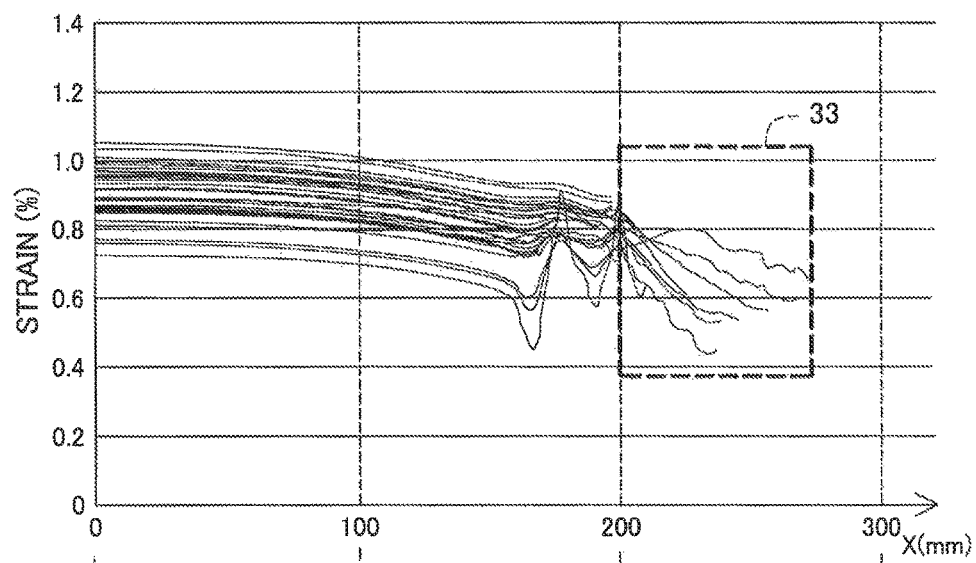
FIGS. 7A and 7B show the results of a strength analysis simulation of the reference example.
Figure 7B:
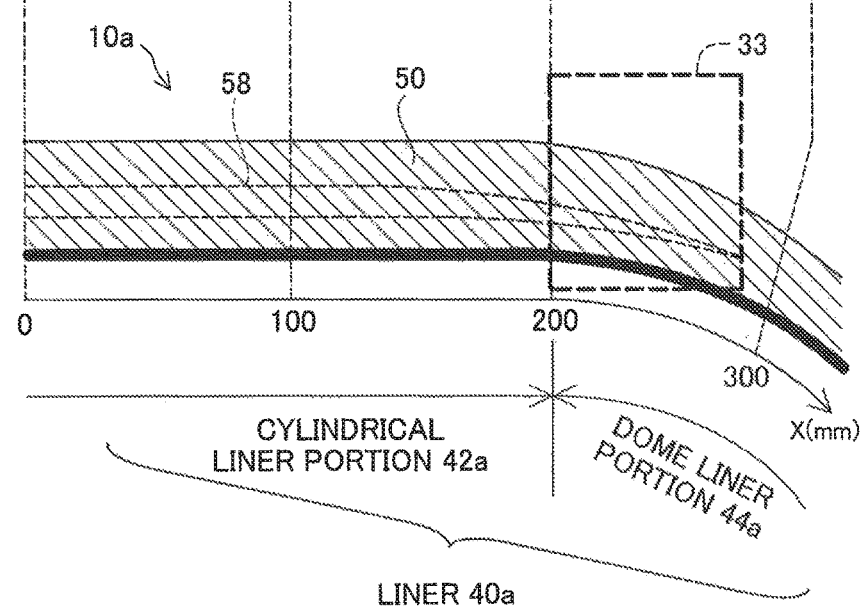

FIGS. 7A and 7B show the results of a strength analysis simulation of the reference example. The strength analysis simulation applied an internal pressure of 180 MPa to the high-pressure tank 10a. The finite element approach was employed for the simulation. The abscissa in the graph of FIG. 7A shows a distance X from the middle position of the cylindrical liner portion 42a along the outer surface of the high-pressure tank 10a in the direction from the middle position of the cylindrical liner portion 42a toward the mouthpiece 14 (FIG. 1A). The ordinate in the graph of FIG. 7A shows the magnitude of strain in the fiber direction (hereinafter the strain in the fiber direction is referred to as "fiber strain") of the hoop layers 56 and the high-angle helical layers 58 (FIG. 5A) at the distance X. FIG. 7B is a schematic cross sectional view of the high-pressure tank 10a at the distance X shown in FIG. 7A. In FIG. 7B, the stacking range of the high-angle helical layers 58 in part of the dome liner portion 44a and in the cylindrical liner portion 42a is conceptually shown by the dotted line.

As shown in FIG. 7A, in the high-pressure tank 10a of the reference example, the shoulder 33 has the smaller strain in the fiber direction (fiber strain) than the central region of the high-pressure tank 10a. In other words, reinforcement of the shoulder 33 with the high-angle helical layer 58 decreases the possibility that a fracture of the high-pressure tank 10a starts from the shoulder 33.

Figure 8A:
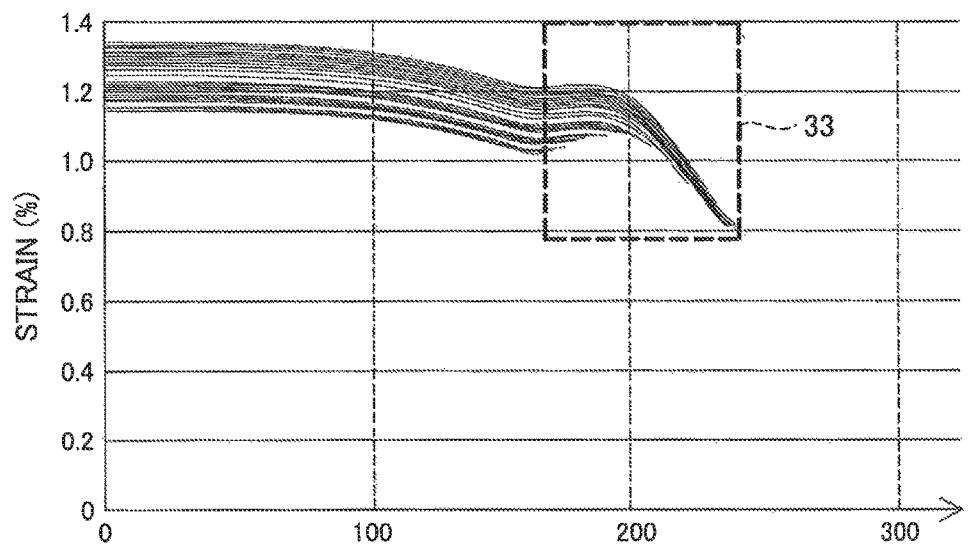
FIGS. 8A and 8B show the results of a strength analysis simulation of the embodiment.
Figure 8B:
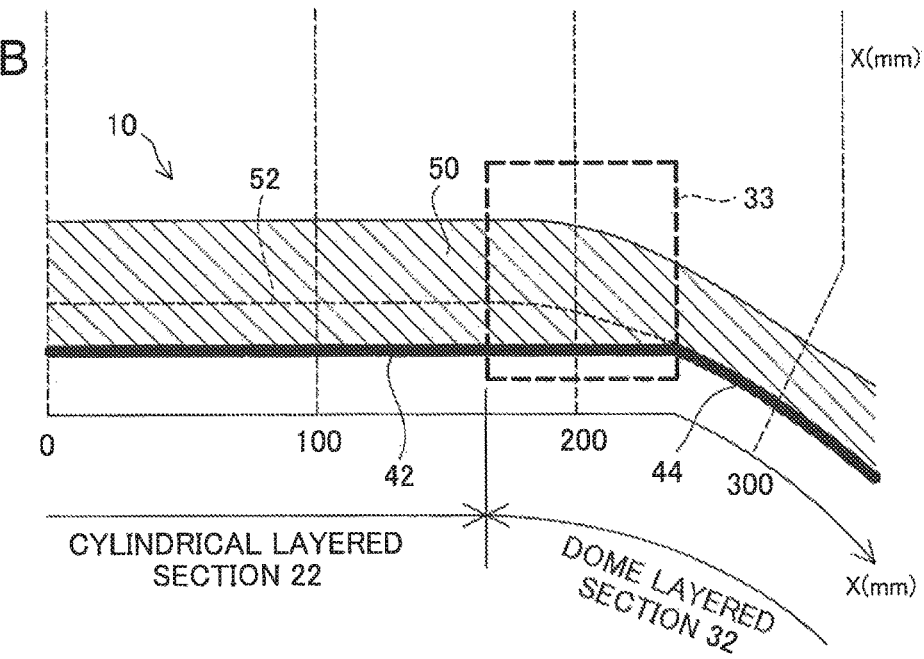

FIGS. 8A and 8B show the results of a strength analysis simulation of the embodiment. The strength analysis simulation applied an internal pressure of 180 MPa to the high-pressure tank 10. The finite element approach was employed for the simulation. The abscissa and the ordinate in the graph of FIG. 8A are similar to those described in FIG. 7A, except that the ordinate of FIG. 8A shows the magnitude of strain in the fiber direction in the hoop layers 52 and 56 (FIG. 5B). FIG. 8B is a schematic cross sectional view of the high-pressure tank 10 at the distance X shown in FIG. 8A. In FIG. 8B, the stacking range of the outer surface hoop layer 52 in the cylindrical liner portion 42 is conceptually shown by the dotted line.

As shown in FIG. 8A, as in the high-pressure tank 10a of the reference example manufactured with the high-angle helical layers 58, in the high-pressure tank 10 of the embodiment manufactured without the high-angle helical layers 58, the shoulder 33 has the smaller fiber strain than the central region of the high-pressure tank 10. This means that the shoulder 33 is reinforced by formation of the outer surface hoop layer 52 in the high-pressure tank 10 of the embodiment.

B. Modifications

Among the various elements described in the above embodiment, the elements other than those disclosed in the independent claims are additional and supplementary elements and may be omitted as needed basis. The invention is, however, not limited to the above embodiment but various modifications and variations may be made to the embodiment without departing from the scope of the invention. Some examples of possible modification are given below.

B-1. First Modification

In the above embodiment, the fibers of the dome hoop portion 52b are configured, such that the slope of the tangent line on the outer surface of the dome hoop portion 52b is equal to the slope of the tangent line on the outer surface of the dome liner portion 44 (FIG. 3B). This configuration is, however, not restrictive. Another configuration is allowed as long as the outer surface hoop layer 52 is formed to have a smaller angle than the angle θ between the tangent line 42f on the outer surface of the cylindrical liner portion 42 and the tangent line 44f on the outer surface of the dome liner portion 44 shown in FIG. 3A. For example, the curve of the outer surface of the dome hoop portion 52b may be different from the curve of the outer surface of the dome liner portion 44. Like the above embodiment, this modification also enables the shoulder 33 to be reinforced with the outer surface hoop layer 52 as one of the hoop layers.

B-2. Second Modification

In the above embodiment, the number of layers of fibers in the dome hoop portion 52b is varied to change the thickness, in order to make the outer surface of the dome hoop portion 52b form the equally stressed surface (FIG. 3B). The thickness of the dome hoop portion 52b may be changed by varying the thickness of fibers, instead of varying the number of layers of fibers. In other words, the dome hoop portion 52b shown in FIG. 3B may be formed by gradually decreasing the thickness of fibers from the cylindrical hoop portion 52a toward the dome liner portion 44. Like the above embodiment, this modification also enables the shoulder 33 to be reinforced with the outer surface hoop layer.

B-3. Third Modification

In the above embodiment, the number of layers of fibers in the cylindrical hoop portion 52a of the outer surface hoop layer 52 is thirteen. This number is, however, not restrictive. The numbers of layers of fibers in the cylindrical hoop portion 52a and in the dome hoop portion 52b of the outer surface hoop layer 52 may be determined according to various specifications, for example, the type of fibers used, the number of layers of fibers in the respective layers other than the outer surface hoop layer 52 (e.g., hoop layers 56 and low-angle helical layers 54 and 57), the winding angle of and the type of fibers used for the low-angle helical layers 54 and 57, in order to make the fiber strain of the shoulder 33 smaller than the fiber strain in the central region of the high-pressure tank 10. The inclination angle θ of the liner 40 (FIG. 3A) may be determined according to the stack structure of the outer surface hoop layer 52, in order to make the outer surface of the hoop dome portion 52b and the outer surface of the dome liner portion 44 form the same equally stressed surface at the boundary between the outer surface hoop layer 52 and the dome liner portion 44. In the high-pressure tank 10 of the embodiment manufactured by using CFRP for the fiber-reinforced resin layer, it is preferable to set the inclination angle θ to be equal to or greater than 20 degrees. This enables formation of the fiber-reinforced resin layer 50 that certainly makes the fiber strain in the shoulder 33 smaller than the fiber strain in the central region of the high-pressure tank 10.

B-4. Fourth Modification

The high-pressure tank 10 according to the invention has the reinforced shoulder 33 and may thus be used to store a higher pressure fluid than the ordinary pressure. For example, the high-pressure tank 10 may be used as a hydrogen tank for storing high-pressure hydrogen gas or a natural gas tank for storing high-pressure natural gas. In one application, any of these gas tanks may be mounted on various moving bodies, such as vehicles, boats and ships and aircraft, to be used as a fuel gas source. In another application, any of these gas tanks may be used as a stationary gas tank.

REFERENCE SIGNS LIST 10, 10a High pressure tank
14 Mouthpiece
14a Opening
15 Guide
20 Cylindrical section
22 Cylindrical layered section
30 Dome section
32 Dome layered section
33 Boundary area (Shoulder)
40, 40a Liner
41 Hoop-layered liner
42 Cylindrical liner portion
42a Cylindrical liner portion
42f Tangent line
44 Dome liner portion
44a Dome liner portion
44f Tangent line
50 Fiber-reinforced resin layer
50a Fiber-reinforced resin layer
51 Fiber
52 Outer surface hoop layer
52 Hoop layer
52a Cylindrical hoop portion
52b Dome hoop portion
54 Low-angle helical layer (Outer surface low-angle helical layer)
56 Hoop layer
57 Low-angle helical layer
58 High-angle helical layer
AX Central axis

The invention claimed is:
1. A high-pressure tank configured to store a fluid, comprising:
a liner; and
a fiber-reinforced resin layer configured to include a fiber and to cover surface of the liner,
wherein the liner includes:
a cylindrical liner portion in a cylindrical shape; and
dome liner portions in a dome shape connected with respective sides of the cylindrical liner portion, each of the dome liner portions being connected with the cylindrical liner portion at a boundary point,
wherein the liner is formed such that, for each dome liner portion, a first tangent line at an outer surface of the cylindrical liner portion at the boundary point is not equal to a second tangent line at an outer surface of the dome liner portion at the boundary point, such that the outer surface of the dome liner portion is inclined at a predetermined angle to the outer surface of the cylindrical liner portion at the boundary point, wherein the predetermined angle is 20 degrees or more,
wherein the fiber-reinforced resin layer includes:
a hoop layer formed directly on the outer surface of the cylindrical liner portion to cover the outer surface of the cylindrical liner portion, the hoop layer being provided by hoop winding that winds the fiber substantially perpendicularly to a central axis of the cylindrical liner portion, wherein the hoop layer is formed, such that an outer surface of the hoop layer has a smaller angle than the predetermined angle to the outer surface of the dome liner portion at a boundary between the hoop layer and the dome liner portion, and wherein the hoop layer includes:
a cylindrical hoop portion configured to have a fixed thickness; and
a dome hoop portion located between the cylindrical hoop portion and the dome liner portion, the dome hoop portion being configured to have thickness gradually decreasing from the fixed thickness, from the cylindrical hoop portion toward the dome liner portion, wherein the fiber-reinforced resin layer further includes:
a helical layer formed on the outer surface of the hoop layer and the outer surface of the dome liner portion, the helical layer being provided by helical winding, wherein the helical winding turns back a winding direction of the fiber at the dome liner portion before the fiber in the helical layer goes round the central axis on the hoop layer,
a first layer is formed by hoop winding, the first layer being formed outside the helical layer, and
a second layer is formed by helical winding, the second layer being formed outside the helical layer.

2. The high-pressure tank according to claim 1,
wherein the cylindrical hoop portion is formed by stacking a predetermined number of layers of the fiber, and
the dome hoop portion is formed by gradually decreasing the number of layers of the fiber from the predetermined number, from the cylindrical hoop portion toward the dome liner portion.

3. The high-pressure tank according to claim 1, wherein an outer surface of the dome hoop portion and an outer surface of the dome liner portion form the same equally stressed surface.

4. The high-pressure tank according to claim 1, wherein the cylindrical liner portion has a constant outer diameter.

5. The high-pressure tank according to claim 1,
wherein the hoop layer is formed, such that a slope of a tangent line on the outer surface of the hoop layer is equal to a slope of a tangent line on the outer surface of the dome liner portion at the boundary.

6. The high-pressure tank according to claim 5,
wherein the fiber-reinforced resin layer has a first type of layer formed by the hoop winding and a second type of layer formed by the helical winding.

7. A manufacturing method of a high-pressure tank used to store a fluid, comprising the steps of:
(a) providing a liner that includes: a cylindrical liner portion in a cylindrical shape; and dome liner portions in a dome shape connected with respective sides of the cylindrical liner portion, each of the dome liner portions being connected with the cylindrical liner portion at a boundary point, wherein the liner is formed such that, for each dome liner portion, a first tangent line at an outer surface of the cylindrical liner portion at the boundary point is not equal to a second tangent line at an outer surface of the dome liner portion at the boundary point, such that the outer surface of the dome liner portion is inclined at a predetermined angle to the outer surface of the cylindrical liner portion, wherein the predetermined angle is 20 degrees or more; and (b) forming a fiber-reinforced resin layer including a fiber to cover surface of the liner, wherein the step (b) includes the step of forming a hoop layer directly on the outer surface of the cylindrical liner portion by hoop winding that winds the fiber substantially perpendicularly to a central axis of the cylindrical liner portion to cover the outer surface of the cylindrical liner portion, wherein the hoop layer is formed, such that an outer surface of the hoop layer has a smaller angle than the predetermined angle to the outer surface of the dome liner portion at a boundary between the hoop layer and the dome liner portion, and wherein the hoop layer includes:
a cylindrical hoop portion configured to have a fixed thickness; and
a dome hoop portion located between the cylindrical hoop portion and the dome liner portion, the dome hoop portion being configured to have thickness gradually decreasing from the fixed thickness, from the cylindrical hoop portion toward the dome liner portion, wherein the fiber-reinforced resin layer further includes:
a helical layer formed on the outer surface of the hoop layer and the outer surface of the dome liner portion, the helical layer being provided by helical winding, wherein the helical winding turns back a winding direction of the fiber at the dome liner portion before the fiber in the helical layer goes round the central axis on the hoop layer,
a first layer is formed by hoop winding, the first layer being formed outside the helical layer, and
a second layer is formed by helical winding, the second layer being formed outside the helical layer.

8. The manufacturing method of claim 7, wherein an outer surface of the dome hoop portion and an outer surface of the dome liner portion form the same equally stressed surface.

9. The manufacturing method of claim 7, wherein the cylindrical liner portion has a constant outer diameter.

* * * * *